United States Patent
Hashimoto et al.

(10) Patent No.: US 9,985,555 B2
(45) Date of Patent: May 29, 2018

(54) PIEZOELECTRIC DRIVING DEVICE, ROBOT, AND DRIVING METHOD OF THE SAME

(71) Applicant: Seiko Epson Corporation, Tokyo (JP)

(72) Inventors: Yasuharu Hashimoto, Minamiminowa (JP); Akio Konishi, Matsumoto (JP)

(73) Assignee: Seiko Epson Corporation (JP)

( * ) Notice: Subject to any disclaimer, the term of this patent is extended or adjusted under 35 U.S.C. 154(b) by 328 days.

(21) Appl. No.: 14/823,366

(22) Filed: Aug. 11, 2015

(65) Prior Publication Data

US 2016/0049572 A1 Feb. 18, 2016

(30) Foreign Application Priority Data

Aug. 13, 2014 (JP) ................. 2014-164628

(51) Int. Cl.
  *H02N 2/00* (2006.01)
  *H02P 25/02* (2016.01)
  *B25J 9/12* (2006.01)
  *H02N 2/10* (2006.01)

(52) U.S. Cl.
  CPC ........... *H02N 2/004* (2013.01); *B25J 9/12* (2013.01); *H02N 2/0075* (2013.01); *H02N 2/103* (2013.01); *H02P 25/027* (2013.01); *Y10S 901/28* (2013.01)

(58) Field of Classification Search
  CPC ............ H01L 41/0906; H01L 41/042; H01L 41/0472; H02N 2/103; H02N 2/004; H02N 2/0075

USPC ........................................ 310/323.01–323.21
See application file for complete search history.

(56) References Cited

U.S. PATENT DOCUMENTS

| | | | |
|---|---|---|---|
| 7,224,102 B2 | 5/2007 | Miyazawa | |
| 2004/0135472 A1 | 7/2004 | Kita et al. | |
| 2004/0217671 A1* | 11/2004 | Rosenthal | A61M 5/142 310/328 |
| 2009/0009109 A1* | 1/2009 | Hashimoto | H02N 2/004 318/116 |
| 2010/0296145 A1 | 11/2010 | Takeda | |

FOREIGN PATENT DOCUMENTS

| | | |
|---|---|---|
| JP | 2004-180496 A | 6/2004 |
| JP | 2004-320979 A | 11/2004 |
| JP | 2005-328698 A | 11/2005 |
| JP | 2006-271022 A | 10/2006 |
| JP | 2009-186652 A | 8/2009 |
| JP | 2014-082874 A | 5/2014 |

* cited by examiner

*Primary Examiner* — Derek Rosenau
(74) *Attorney, Agent, or Firm* — Harness, Dickey & Pierce, P.L.C.

(57) ABSTRACT

A piezoelectric driving device includes a piezoelectric body; an electrode provided on the piezoelectric body; and a driving circuit which applies a driving voltage to the electrode, wherein the piezoelectric body has a thickness of 0.05 μm to 20 μm, and the driving voltage is a voltage obtained by adding an offset voltage to a fluctuating voltage.

19 Claims, 11 Drawing Sheets

PIEZOELECTRIC DRIVING DEVICE, ROBOT, AND DRIVING METHOD OF THE SAME

BACKGROUND

1. Technical Field

The present invention relates to a piezoelectric driving device, and various apparatuses such as a robot including a piezoelectric driving device.

2. Related Art

In the related art, a piezoelectric actuator (piezoelectric driving device) using a piezoelectric element has been known (for example, see JP-A-2004-320979). A basic configuration of this piezoelectric driving device is a configuration in which four piezoelectric elements are arranged on each of two surfaces of a reinforcing plate to have two rows and two columns, and accordingly, eight piezoelectric elements in total are provided on both sides of the reinforcing plate. Each piezoelectric element is a unit in which a piezoelectric body is interposed between two electrodes and the reinforcing plate is also used as one electrode of the piezoelectric element. A protrusion which comes into contact with a rotor, which is a body to be driven, to rotate the rotor is provided on one end of the reinforcing plate. When the AC voltage is applied to two piezoelectric elements diagonally disposed among the four piezoelectric elements, the two piezoelectric elements perform an expansion and contraction operation, and accordingly, the protrusion of the reinforcing plate performs a reciprocal operation or an elliptic operation. The rotor, which is a body to be driven, rotates in a predetermined rotation direction according to the reciprocal operation or the elliptic operation of the protrusion of the reinforcing plate. In addition, it is possible to rotate the rotor in a reverse direction, by switching the two piezoelectric elements to be targets of application of the AC voltage, with the other two piezoelectric elements.

In the related art, a so-called bulk-like piezoelectric body has been used as a piezoelectric body used in the piezoelectric driving device. In this specification, the "bulk-like piezoelectric body" means a piezoelectric body having a thickness equal to or greater than 100 μm. A reason for using the bulk-like piezoelectric body is because it is desired to increase the thickness of the piezoelectric body, in order to sufficiently increase an amount of force applied to a body to be driven from the piezoelectric driving device.

However, it is desired to miniaturize the piezoelectric driving device to be used as a miniaturized actuator which can be accommodated in a small space. However, when the thickness of the piezoelectric body is decreased for miniaturizing the piezoelectric driving device, a great driving current is necessary. As the driving current increases, a thickness of a wiring also increases, and accordingly, when the piezoelectric driving device is disposed in a small space (for example, in a joint of a robot), wiring space may be insufficient.

SUMMARY

An advantage of some aspects of the invention is to solve at least a part of the problems described above, and the invention can be implemented as the following forms or application examples.

An aspect of the present invention provides a piezoelectric driving device including: a piezoelectric body; an electrode provided on the piezoelectric body; and a driving circuit which applies a driving voltage to the electrode, wherein the piezoelectric body has a thickness of 0.05 μm to 20 μm, and the driving voltage is a voltage obtained by adding an offset voltage to a fluctuating voltage.

According to the piezoelectric driving device, since the voltage obtained by applying an offset voltage to a fluctuating voltage is applied to the piezoelectric element as a driving voltage, it is possible to decrease a driving current, even when the piezoelectric body having a small thickness is used.

In the piezoelectric driving device according to aspect described above, the material of the piezoelectric body may include lead zirconate titanate, and the offset voltage may be equal to or greater than 20 V.

With this configuration, it is possible to sufficiently decrease the driving current.

In the piezoelectric driving device according to aspect described above, the piezoelectric body may have a thickness of 0.05 μm to 10 μm.

With this configuration, an effect of a decrease in a driving current by applying the offset voltage to the AC voltage is more significantly obtained, compared to a case where the thickness of the piezoelectric body exceeds 10 μm.

In the piezoelectric driving device according to aspect described above, the piezoelectric body may have a thickness of 0.05 μm to 3 μm.

With this configuration, an effect of a decrease in a driving current by applying the offset voltage to the AC voltage is even more significantly obtained, compared to a case where the thickness of the piezoelectric body exceeds 3 μm.

In the piezoelectric driving device according to aspect described above, the piezoelectric driving device may include a vibrating plate which includes a first surface and a second surface; and a piezoelectric vibrating body which includes the piezoelectric body and the electrode, wherein the piezoelectric vibrating body may be disposed on at least one surface of the first surface and the second surface of the vibrating plate.

With this configuration, it is possible to generate force with the vibration of the vibrating plate and the piezoelectric vibrating body.

In the piezoelectric driving device according to aspect described above, the piezoelectric vibrating body may be disposed on the first surface and the second surface of the vibrating plate.

With this configuration, since the piezoelectric vibrating body is disposed on both surfaces of the first surface and the second surface of the vibrating plate, it is possible to increase a driving force of the piezoelectric driving device.

In the piezoelectric driving device according to aspect described above, the piezoelectric driving device may include a protrusion which is provided on the vibrating plate and comes into contact with a body to be driven.

With this configuration, it is possible to operate a body to be driven using the protrusion.

In the piezoelectric driving device according to aspect described above, the electrode may include a first electrode and a second electrode, and the piezoelectric body may be positioned between the first electrode and the second electrode.

The invention can be implemented in various forms, and, for example, can be implemented in various embodiments of various apparatuses, a driving method thereof such as a driving method of a piezoelectric driving device, a manufacturing method of a piezoelectric driving device, and a robot including a piezoelectric driving device mounted thereon, in addition to the piezoelectric driving device.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1A:
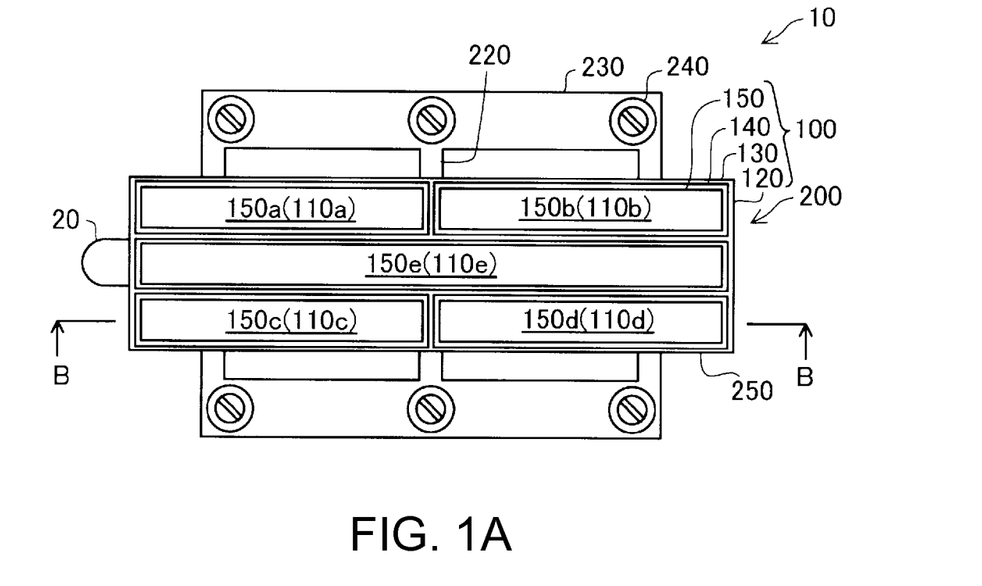
FIGS. 1A and 1B are respectively a plan view and a sectional view showing a schematic configuration of a piezoelectric driving device of a first embodiment.
Figure 1B:
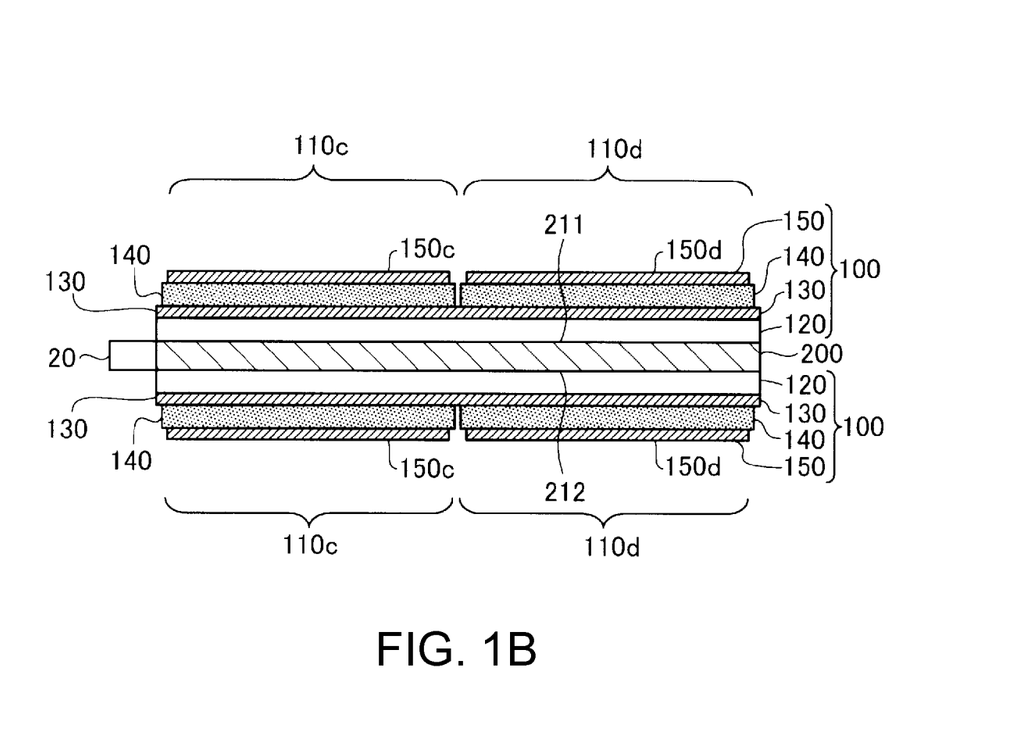

FIG. 1A is a plan view showing a schematic configuration of a piezoelectric driving device 10 of a first embodiment of the invention and FIG. 1B is a sectional view taken along line B-B. A piezoelectric driving device 10 includes a vibrating plate 200, and two piezoelectric vibrating bodies 100 respectively disposed on both surfaces (a first surface 211 and a second surface 212) of the vibrating plate 200. Each of the piezoelectric vibrating bodies 100 include a substrate 120, a first electrode 130 formed on the substrate 120, a piezoelectric body 140 formed on the first piezoelectric electrode 130, and a second electrode 150 formed on the piezoelectric body 140. The piezoelectric body 140 is interposed between the first electrode 130 and the second electrode 150. The two piezoelectric vibrating bodies 100 are symmetrically disposed with the vibrating plate 200 as a center. Since the two piezoelectric vibrating bodies 100 have the same configuration, the configuration of the piezoelectric vibrating body 100 on the upper side of the vibrating plate 200 will be described hereinafter, unless otherwise noted.

The substrate 120 of the piezoelectric vibrating body 100 is used as a substrate for forming the first electrode 130, the piezoelectric body 140, and the second electrode 150 in a film forming process. The substrate 120 also has a function as a vibrating plate which performs mechanical vibration. The substrate 120 can be formed of Si, $Al_2O_3$, or $ZrO_2$, for example. As the substrate 120 formed of Si, a Si wafer for semiconductor manufacturing can be used, for example. In the embodiment, a planar shape of the substrate 120 is a rectangle. A thickness of the substrate 120 is, for example, preferably in a range of 10 μm to 100 μm. When the thickness of the substrate 120 is equal to or greater than 10 μm, it is possible to comparatively easily treat the substrate 120, at the time of performing a film forming process on the substrate 120. When the thickness of the substrate 120 is equal to or smaller than 100 μm, it is possible to easily vibrate the substrate 120 according to expansion and contraction of the piezoelectric body 140 formed of a thin film.

The first electrode 130 is formed as one continuous conductor layer which is formed on the substrate 120. Meanwhile, as shown in FIG. 1A, the second electrode 150 is divided into five conductor layers 150a to 150e (also referred to as "second electrodes 150a to 150e"). The second electrode 150e in the center is formed to have a rectangular shape over substantially all of the substrate 120 in a longitudinal direction, in the center of the substrate 120 in a width direction. The other four second electrodes 150a, 150b, 150c, and 150d have the same planar shape and are formed at four corners of the substrate 120. In the example of FIGS. 1A and 1B, both the first electrode 130 and the second electrode 150 have a rectangular planar shape. The first electrode 130 or the second electrode 150 is a thin film which is formed by sputtering, for example. As a material of the first electrode 130 or the second electrode 150, any material having high conductivity such as Al (aluminum), Ni (nickel), Au (gold), Pt (platinum), or Ir (iridium) can be used, for example. In addition, instead of setting the first electrode 130 as one continuous conductor layer, the first electrode may be divided into five conductor layers having planar shapes which are substantially the same as those of the second electrodes 150a to 150e. Wiring (or a wiring layer or an insulating layer) for electrically connecting the second electrodes 150a to 150e with each other and wiring (or a wiring layer or an insulating layer) for electrically connecting the electrode 130, the second electrodes 150a to 150e, and a driving circuit with each other are not shown in FIGS. 1A and 1B.

The piezoelectric body 140 is formed as five piezoelectric layers having planar shapes which are substantially the same as those of the second electrodes 150a to 150e. Instead of that, the piezoelectric body 140 may be formed as one continuous piezoelectric layer having a planar shape substantially the same as that of the first electrode 130. Five piezoelectric elements 110a to 110e (FIG. 1A) are configured by the laminated structure of the first electrode 130, the piezoelectric body 140, and the second electrodes 150a to 150e.

The piezoelectric body 140 is a thin film which is formed by a sol-gel method or a sputtering method, for example. As a material of the piezoelectric body 140, any material exhibiting a piezoelectric effect such as ceramics having an $ABO_3$ type perovskite structure can be used. Examples of the ceramics having an $ABO_3$ type perovskite structure include lead zirconate titanate (PZT), barium titanate, lead titanate, potassium niobate, lithium niobate, lithium tantalate, sodium tungstate, zinc oxide, barium strontium titanate (BST), strontium bismuth tantalate (SBT), lead metaniobate, zinc niobate lead, and scandium niobate. As a material exhibiting a piezoelectric effect other than the ceramics, polyvinylidene fluoride or crystal can also be used, for example. A thickness of the piezoelectric body 140 is, for example, preferably in a range of 50 nm (0.05 μm) to 20 μm. A thin film of the piezoelectric body 140 having a thickness of this range can easily be formed by using a film forming process. When the thickness of the piezoelectric body 140 is equal to or greater than 0.05 µm, it is possible to generate sufficiently great power according to expansion and contraction of the piezoelectric body 140. When the thickness of the piezoelectric body 140 is equal to or smaller than 20 µm, it is possible to sufficiently miniaturize the piezoelectric driving device 10.

Figure 2:
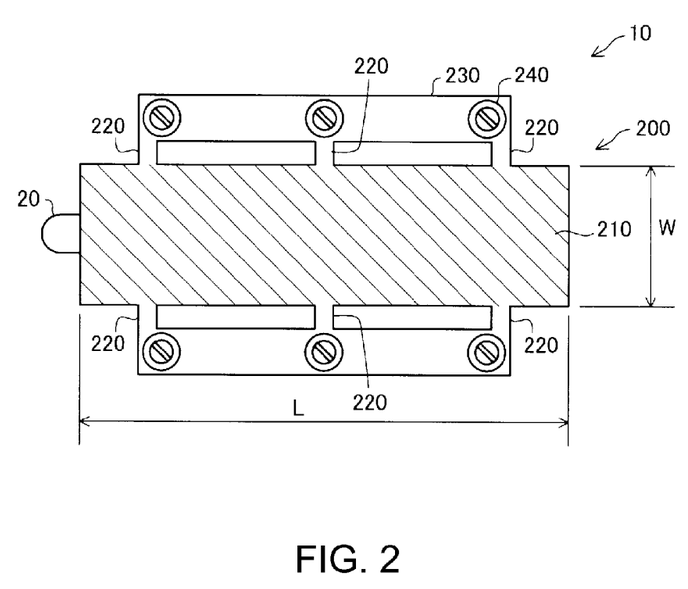
FIG. 2 is a plan view of a vibrating plate.

FIG. 2 is a plan view of the vibrating plate 200. The vibrating plate 200 includes a rectangular vibrator portion 210, three connection portions 220 which extend from right and left long sides of the vibrator portion 210, and two attachment portions 230 which are connected to the respective three connection portions 220 on both right and left sides. In FIG. 2, for convenience of description, an area of the vibrator portion 210 is hatched. The attachment portions 230 are used for attaching the piezoelectric driving device 10 to another member with screws 240. The vibrating plate 200, for example, can be formed with a metal material such as stainless steel, aluminum, an aluminum alloy, titanium, a titanium alloy, copper, a copper alloy, or an iron-nickel alloy.

The piezoelectric vibrating bodies 100 (FIGS. 1A and 1B) are respectively mounted on an upper surface (first surface) and a lower surface (second surface) of the vibrator portion 210 using an adhesive. A ratio of a length L and a width W of the vibrator portion 210 is preferably approximately L:W=7:2. This ratio is a preferable value for performing ultrasonic vibration (which will be described later) in which the vibrator portion 210 curves to the right and left along the flat surface thereof. The length L of the vibrator portion 210 can be set, for example, in a range of 3.5 mm to 30 mm and the width W thereof can be set, for example, in a range of 1 mm to 8 mm. Since the vibrator portion 210 performs ultrasonic vibration, the length L thereof is preferably equal to or smaller than 50 nm. A thickness of the vibrator portion 210 (thickness of vibrating plate 200) can be set, for example, in a range of 50 µm to 700 µm. When the thickness of the vibrator portion 210 is equal to or greater than 50 µm, sufficient rigidity for supporting the piezoelectric vibrating body 100 is obtained. When the thickness of the vibrator portion 210 is equal to or smaller than 700 µm, sufficiently great deformation can occur according to deformation of the piezoelectric vibrating body 100.

A protrusion 20 (also referred to as a "contacting portion" or an "operating portion") is provided on one short side of the vibrating plate 200. The protrusion 20 is a member which comes into contact with a body to be driven to apply force to a body to be driven. The protrusion 20 is preferably formed of a material having durability such as ceramics (for example, Al$_2$O$_3$).

Figure 3:
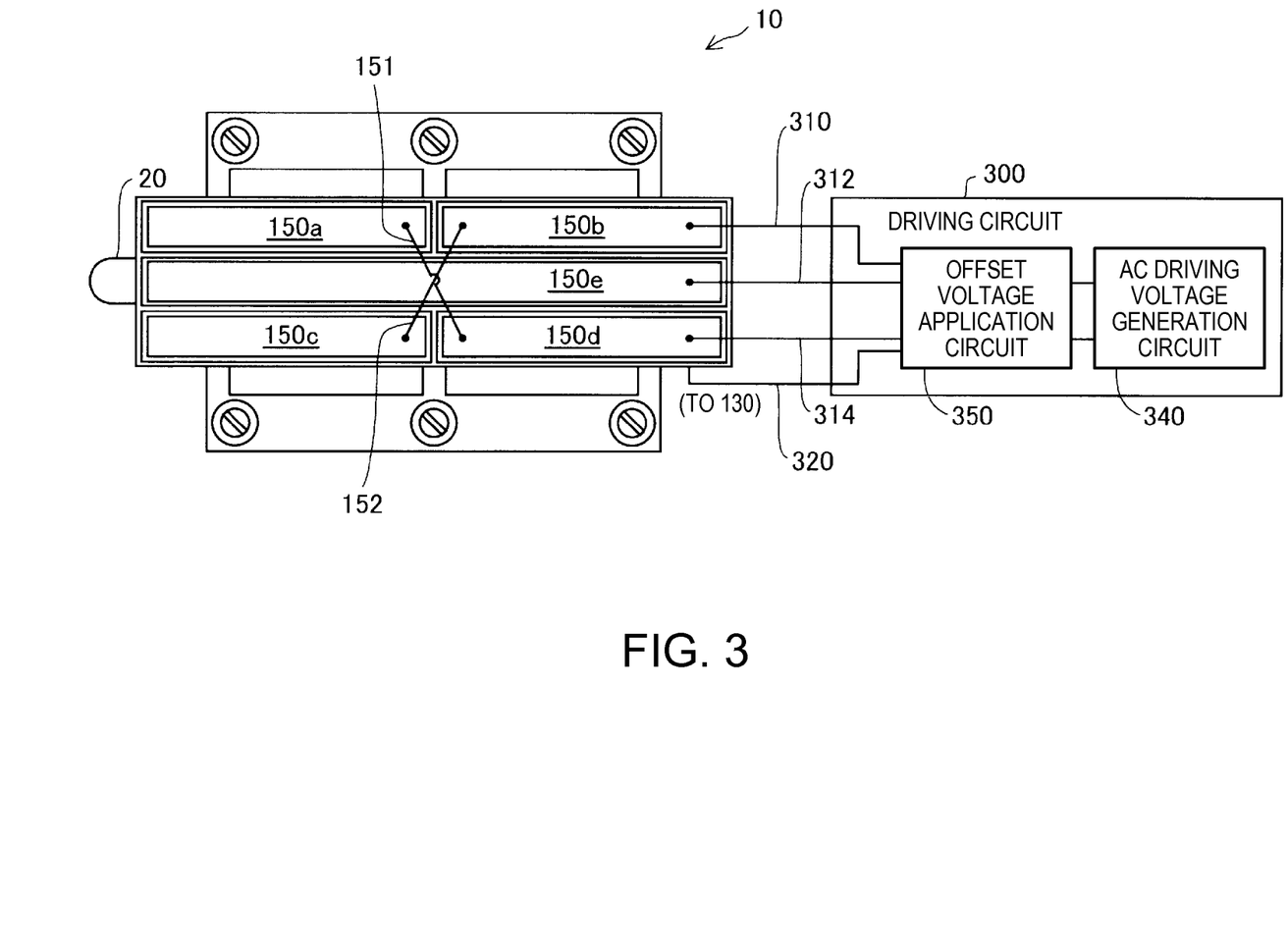
FIG. 3 is an explanatory diagram showing an electrical connection state of the piezoelectric driving device and a driving circuit.

FIG. 3 is an explanatory diagram showing an electrical connection state of the piezoelectric driving device 10 and a driving circuit 300. The driving circuit 300 includes an AC driving voltage generation circuit 340 and an offset voltage application circuit 350. The AC driving voltage generation circuit 340 generates an AC driving voltage which fluctuates to the positive side or negative side with respect to ground potential. This AC driving voltage is preferably a voltage signal at a frequency which is close to a mechanical resonance frequency of the piezoelectric driving device 10. The offset voltage application circuit 350 generates an offset driving voltage by applying an offset voltage to the AC driving voltage. The offset voltage to be applied is preferably a DC voltage at a constant level. The offset driving voltage is preferably an undulating voltage (voltage having a constantly positive voltage level), but the offset driving voltage may be equal to or greater than a coercive voltage of the piezoelectric body 140, even when the offset driving voltage has a portion where the voltage level is opposite in polarity. This is because when the offset driving voltage is equal to or smaller than the coercive voltage, a possibility of dielectric breakdown of the piezoelectric body 140 is increased. It is not necessary for the driving voltage to periodically fluctuate as the AC voltage and the driving voltage may be non-periodically fluctuated. The offset driving voltage may be generated using a circuit configuration which is different from that of the driving circuit 300 of FIG. 3. Also, in this case, it is preferable that the offset voltage is applied to the voltage which is non-periodically fluctuated. The driving circuit 300 and the electrodes 130 and 150 of the piezoelectric driving device 10 are connected to each other as follows.

Among the five second electrodes 150a to 150e of the piezoelectric driving device 10, a pair of diagonal second electrodes 150a and 150d are electrically connected to each other through a wiring 151, and another pair of diagonal second electrodes 150b and 150c are also electrically connected to each other through a wiring 152. The wirings 151 and 152 may be formed by a film forming process or may be implemented by wire-shaped wiring. The three second electrodes 150b, 150e, and 150d disposed on the right side of FIG. 3 and the first electrode 130 (FIGS. 1A and 1B) are electrically connected to the driving circuit 300 through wirings 310, 312, 314, and 320. By applying an AC voltage or an undulating voltage which periodically changes, between a pair of second electrodes 150a and 150d and the first electrode 130, the driving circuit 300 can cause the piezoelectric driving device 10 to perform ultrasonic vibration and rotate a rotor (body to be driven) which comes into contact with the protrusion 20, in a predetermined rotation direction. Herein, the "undulating voltage" means a voltage obtained by applying DC offset to the AC voltage, and a direction of the voltage (electric field) thereof is a direction from one electrode to the other electrode. In addition, by applying an AC voltage or an undulating voltage between another pair of second electrodes 150b and 150c and the first electrode 130, a rotor which comes into contact with the protrusion 20 can be rotated in a reverse direction. The application of the voltage can be simultaneously performed on the two piezoelectric vibrating bodies 100 provided on both surfaces of the vibrating plate 200. A wiring (or a wiring layer or an insulating layer) configuring the wirings 151, 152, 310, 312, 314, and 320 shown in FIG. 3 is not shown in FIGS. 1A and 1B.

Figure 4:
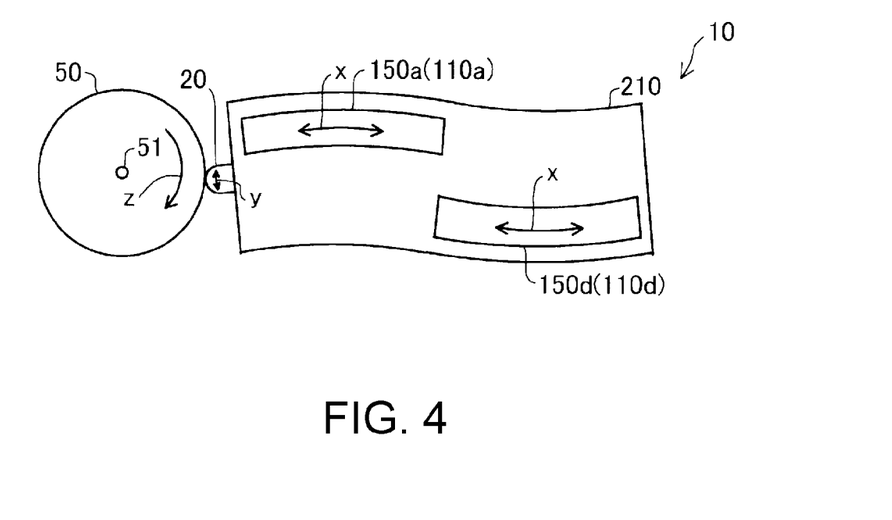
FIG. 4 is an explanatory diagram showing an example of operations of the piezoelectric driving device.

FIG. 4 is an explanatory diagram showing an example of operations of the piezoelectric driving device 10. The protrusion 20 of the piezoelectric driving device 10 comes into contact with an outer circumference of a rotor 50 which is a body to be driven. In an example shown in FIG. 4A, the driving circuit 300 (FIG. 3) applies an AC voltage or an undulating voltage between a pair of second electrodes 150a and 150d and the first electrode 130, and accordingly, the piezoelectric elements 110a and 110d expand or contract in a direction of an arrow x shown in FIG. 4. According to this, the vibrator portion 210 of the piezoelectric driving device 10 curves in a flat surface of the vibrator portion 210 to be deformed in a meander shape (S shape), and a tip end of the protrusion 20 performs a reciprocal operation or an elliptic operation in a direction of an arrow y. As a result, the rotor 50 is rotated around the center 51 thereof in a predetermined direction z (clockwise in FIG. 4). The three connection portions 220 (FIG. 2) of the vibrating plate 200 described in FIG. 2 are provided at a position of a node of vibration of the vibrator portion 210. When the driving circuit 300 applies an AC voltage or an undulating voltage between another pair of second electrodes 150b and 150c and the first electrode 130, the rotor 50 is rotated in a reverse direction. When the same voltage as that applied to a pair of second electrodes 150a and 150d (or another pair of second electrodes 150b and 150c) is applied to the second electrode 150e in the center, the piezoelectric driving device 10 contracts in a longitudinal direction, and accordingly, it is possible to increase the magnitude of force applied to the rotor 50 from the protrusion 20. Such an operation regarding the piezoelectric driving device 10 (or piezoelectric vibrating body 100) is disclosed in JP-A-2004-320979 or U.S. Pat. No. 7,224,102 thereof, and the disclosed content thereof is incorporated by reference.

Figure 5:
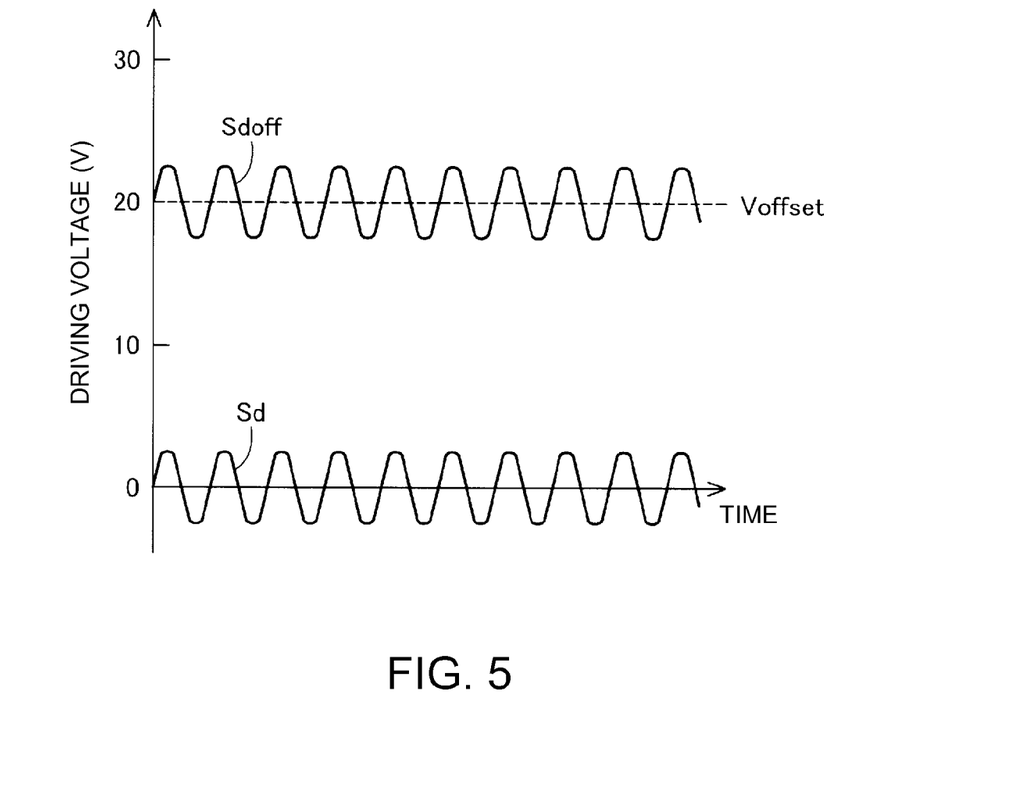
FIG. 5 is a graph showing a driving voltage.

FIG. 5 is a graph showing an example of the driving voltage. A horizontal axis of FIG. 5 indicates time and a vertical axis indicates a driving voltage. Herein, an example of an AC driving voltage Sd generated by the AC driving voltage generation circuit 340 and an example of an offset driving voltage Sdoff generated by the offset voltage application circuit 350 are shown. 0 V of the driving voltage corresponds to ground potential. In this example, the AC driving voltage Sd is an AC signal having the entire amplitude of approximately 5 V and an offset voltage Voffset is a constant value of 20 V. Accordingly, the offset driving voltage Sdoff in this example is an undulating voltage constantly having a positive voltage value. As will be described later, it is preferable to use the offset driving voltage Sdoff, in order to decrease the driving current of the piezoelectric driving device 10. Since the greatest driving current is also decreased, it is possible to suppress the capacitance necessary for the driving circuit 300 to be small. An arbitrary value can be used as a value of the AC driving voltage Sd, but the value thereof can be a value in a range of 3 V to 10 V, when using the PZT piezoelectric body 140 having a thickness of 0.05 µm to 20 µm. A preferable value of the offset voltage Voffset will be described later.

Figure 6A:
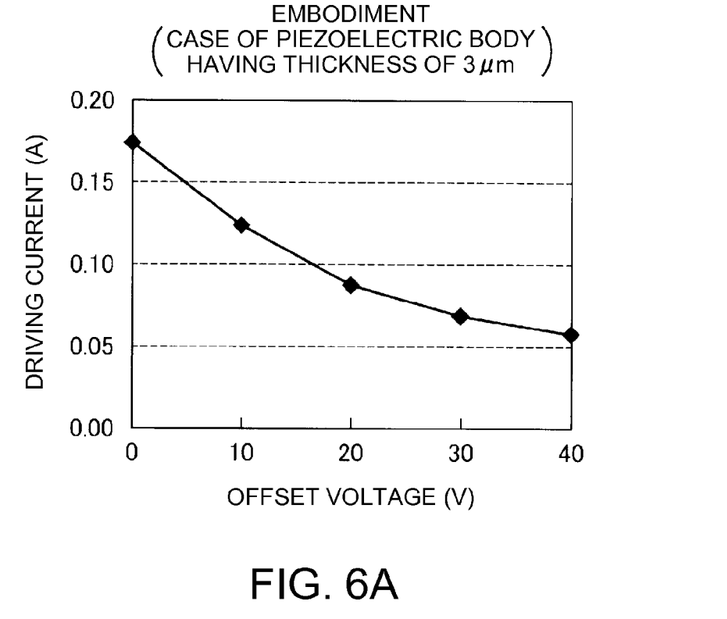
FIGS. 6A and 6B are graphs showing a relationship between an offset voltage and a driving current and capacitance of the embodiment.
Figure 6B:
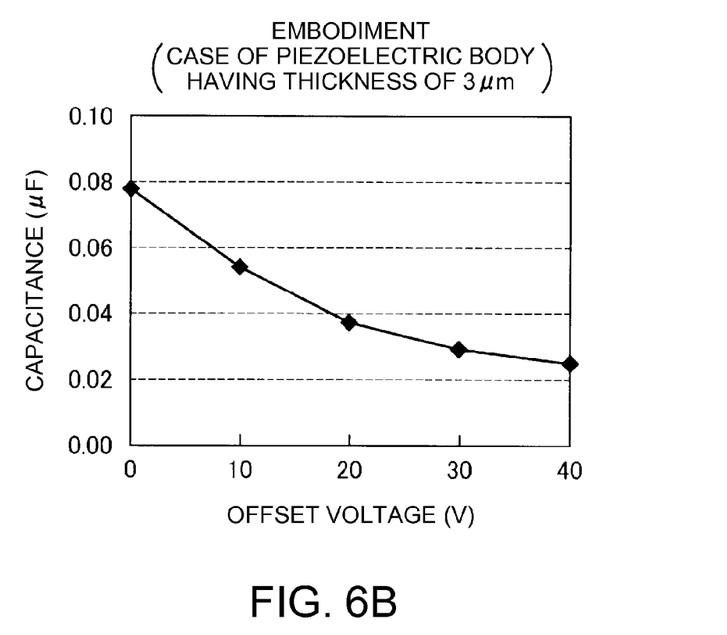

FIGS. 6A and 6B are graphs showing a relationship between the offset voltage, the driving current, and the capacitance of the embodiment. This example shows an experimental result when using the piezoelectric element having a thickness of the piezoelectric body 140 of 3 µm. In the measurement conditions, a frequency is 1 kHz and an AC voltage having a half amplitude of 0.5 V is applied. According to a result thereof, by applying the offset voltage which is not zero, it is possible to decrease the capacitance and the driving current of the piezoelectric element 110. As the offset voltage increases, the capacitance of the piezoelectric element 110 decreases, and according to this, the driving current thereof also decreases. Particularly, it is preferable to set the offset voltage to be equal to or greater than 20 V, in order to decrease the driving current to be decreased by approximately ½ or less, compared to a case where the offset voltage is 0. It is more preferable to set the offset voltage to be equal to or greater than 40 V, in order to decrease the driving current to be decreased by approximately ⅓ or less, compared to a case where the offset voltage is 0. An upper limit value of the offset voltage is generally determined according to voltage endurance characteristics of the piezoelectric body 140 or voltage supply capacity of the driving circuit 300.

Figure 7A:
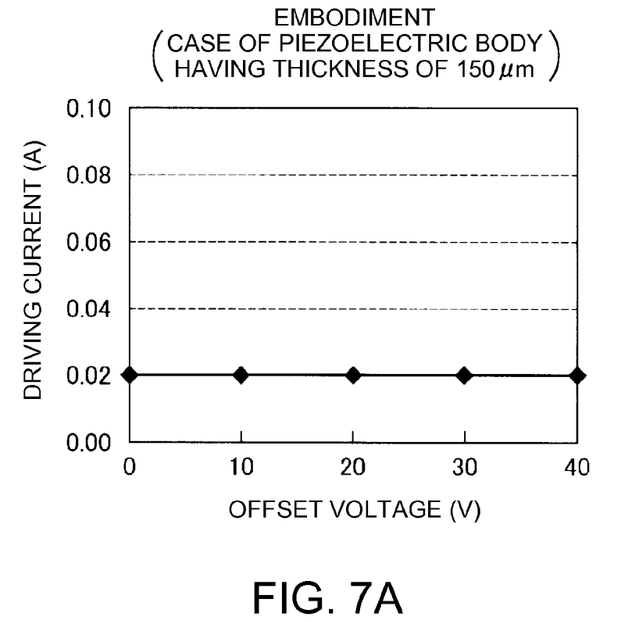
FIGS. 7A and 7B are graphs showing a relationship between an offset voltage and a driving current and capacitance of a comparative example.
Figure 7B:
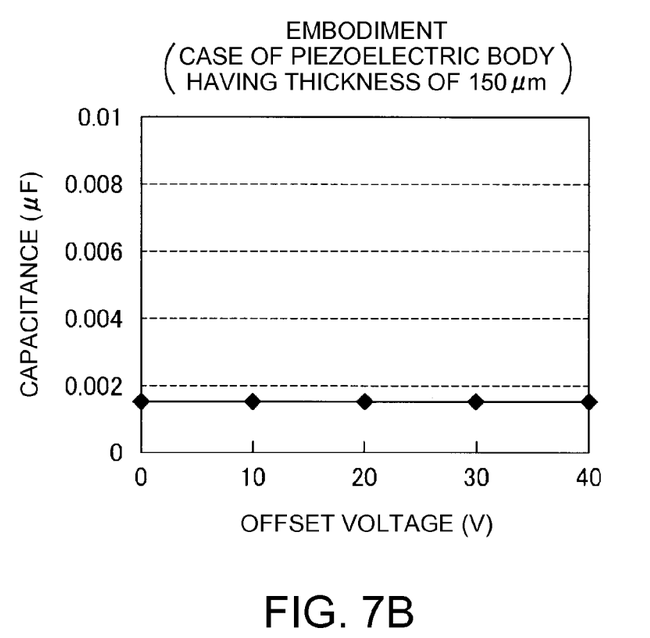

FIGS. 7A and 7B are graphs showing a relationship between the offset voltage, the driving current, and the capacitance of a comparative example. This example shows an experimental result when using the piezoelectric element having a thickness of the piezoelectric body of 150 µm. According to a result thereof, even when the offset voltage is large, the capacitance of the piezoelectric element is substantially constant, and the driving current is also constant. In general, as described above, in the piezoelectric element using the bulk-shaped piezoelectric body having a thickness equal to or greater than 100 µm, even when the offset voltage is large, the capacitance or the driving current of the piezoelectric element does not substantially change.

The inventors of the invention have found that the capacitance and the driving voltage regarding the piezoelectric element using the piezoelectric body having a thickness equal to or smaller than 20 µm can be decreased by applying the offset voltage, as shown in FIGS. 6A and 6B. Particularly, as shown in FIG. 5, when the offset voltage Voffset is set to be larger than the half amplitude of the AC driving voltage Sd, the offset driving voltage Sdoff becomes an undulating voltage and an effect of a decrease in the capacitance and the driving voltage of the piezoelectric element is particularly significantly obtained. As the thickness of the piezoelectric body becomes smaller, such an effect of a decrease tends to become significant. Accordingly, it is more preferable to use the offset driving voltage Sdoff when the thickness of the piezoelectric is equal to or smaller than 10 µm, and it is most preferable to use the offset driving voltage when the thickness of the piezoelectric is equal to or smaller than 3 µm. When comparing the example of FIG. 6B and the example of FIG. 7B to each other, it is possible to understand that, as the thickness of the piezoelectric body decreases, the capacitance of the piezoelectric element increases, and a great current is necessary for driving. In this viewpoint, the thickness of the piezoelectric body is preferably equal to or greater than 0.05 µm.

The experimental results of FIGS. 6A to 7B are results obtained when lead zirconate titanate (PZT) is used as the piezoelectric material. However, it is assumed that the same tendency as described above is seen, even when other piezoelectric materials are used.

As described above, according to the embodiment, since the piezoelectric element 110 is driven using the offset driving voltage, the capacitance of the piezoelectric element 110 is decreased and the driving current thereof can be decreased. When the driving current is decreased, heat due to the driving current hardly occurs, and accordingly, it is possible to improve reliability of the piezoelectric driving device 10. In addition, since the output current capacity of the driving circuit 300 can be decreased, it is possible to decrease a circuit scale thereof, to reduce the cost, and to improve reliability. When the capacitance of the piezoelectric element 110 is decreased, impedance thereof increases, and accordingly, the occurrence of a voltage drop of sheet resistance (parasitic resistance) of the electrode of the piezoelectric element 110 or the wiring layer is decreased, and driving efficiency of the driving circuit 300 is improved. In addition, when the occurrence of the voltage drop of sheet resistance is decreased, necessity of a dramatic decrease in sheet resistance is decreased, and accordingly, it is not necessary to increase a film thickness of the electrode and the wiring layer, and as a result, it is possible to sufficiently exhibit the piezoelectric effects of the piezoelectric element 110.

Other Embodiments of Piezoelectric Driving Device

Figure 8:
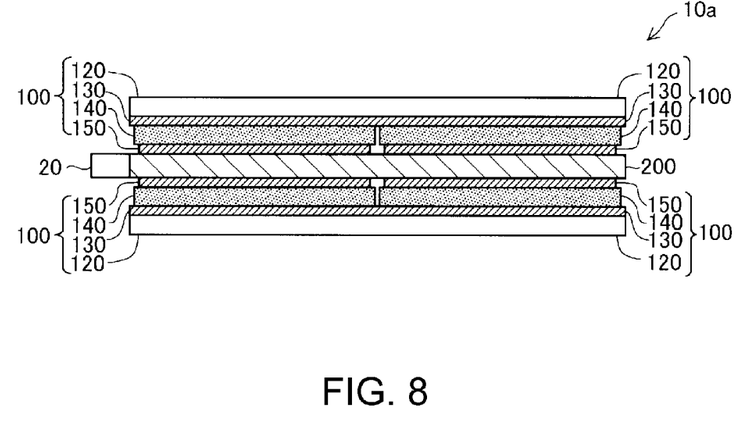
FIG. 8 is a sectional view of a piezoelectric driving device of another embodiment.

FIG. 8 is a sectional view of a piezoelectric driving device 10a as another embodiment of the invention and is a view corresponding to FIG. 1B of the first embodiment. In the piezoelectric driving device 10a, the piezoelectric vibrating body 100 is disposed on the vibrating plate 200 in an upside down state of the state of FIG. 1B. That is, herein, the second electrode 150 is close to the vibrating plate 200 and the substrate 120 is disposed to be farthest from the vibrating plate 200. Also in FIG. 8, wiring (or a wiring layer or an insulating layer) for electrically connecting the second electrodes 150a to 150e with each other and wiring (or a wiring layer or an insulating layer) for electrically connecting the first electrode 130, the second electrodes 150a to 150e, and a driving circuit with each other are omitted in the drawing, in the same manner as in FIG. 1B. The piezoelectric driving device 10a can also achieve the same effects as those in the first embodiment.

Figure 9A:
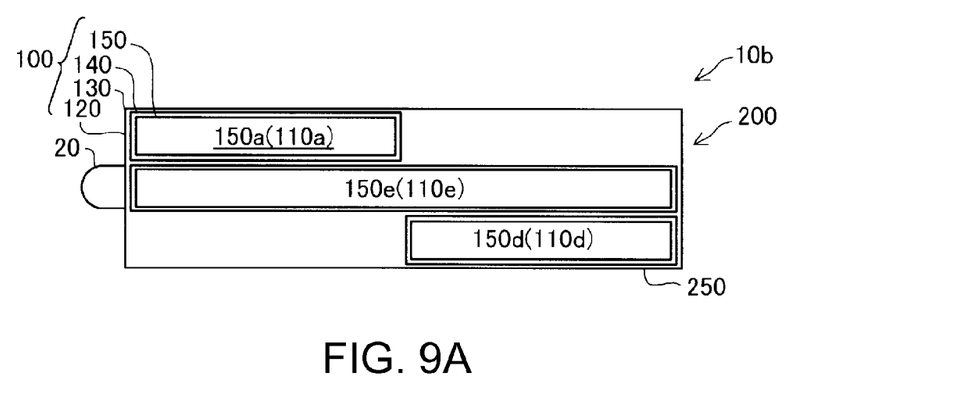
FIGS. 9A to 9C are plan views of a piezoelectric driving device of another embodiment.
Figure 9B:
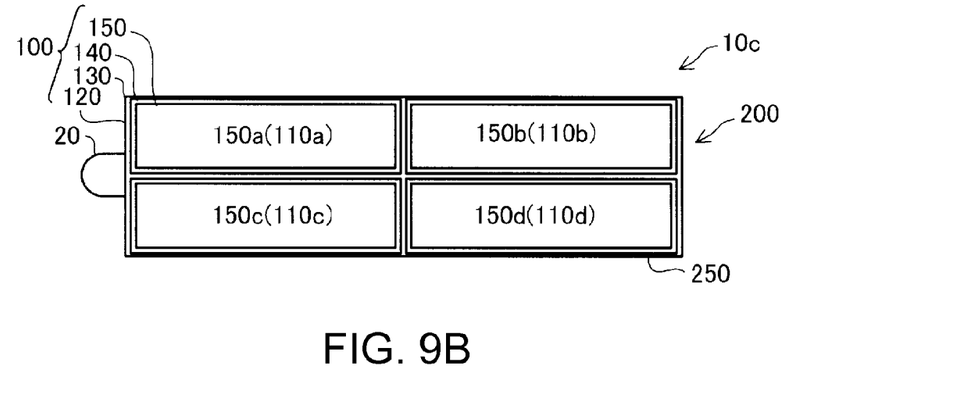
Figure 9C:
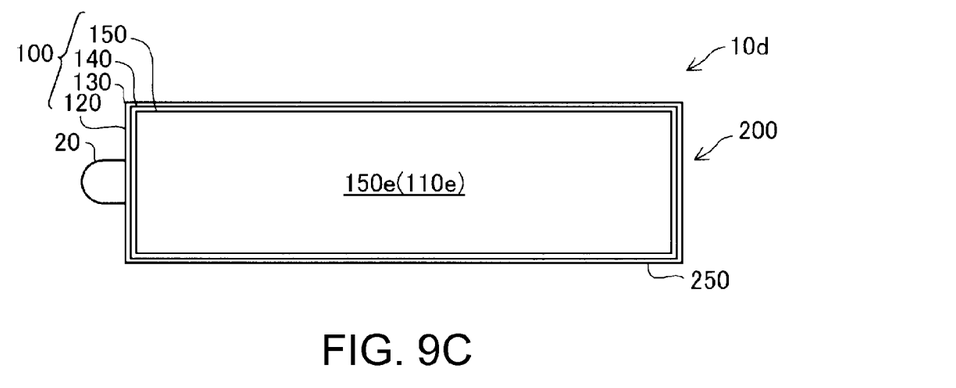

FIG. 9A is a plan view of a piezoelectric driving device 10b as another embodiment of the invention and is a diagram corresponding to FIG. 1A of the first embodiment. In FIGS. 9A to 9C, for convenience of description, the connection portion 220 or the attachment portion 230 of the vibrating plate 200 is omitted. In the piezoelectric driving device 10b of FIG. 9A, the pair of second electrodes 150b and 150c are omitted. This piezoelectric driving device 10b can also rotate the rotor 50 in one direction z as shown in FIG. 4. Since the same voltage is applied to the three second electrodes 150a, 150e, and 150d of FIG. 9A, the three second electrodes 150a, 150e, and 150d may be formed as one connected conductive layer.

FIG. 9B is a plan view of a piezoelectric driving device 10c as still another embodiment of the invention. In the piezoelectric driving device 10c, the second electrode 150e in the center of FIG. 1A is omitted, and the other four second electrodes 150a, 150b, 150c, and 150d are formed in a larger area than that of FIG. 1A. The piezoelectric driving device 10c can also implement substantially the same effects as those of the first embodiment.

FIG. 9C is a plan view of a piezoelectric driving device 10d as still another embodiment of the invention. In the piezoelectric driving device 10d, the four second electrodes 150a, 150b, 150c, and 150d of FIG. 1A are omitted and one second electrode 150e is formed with a large area. The piezoelectric driving device 10d is only expanded or contracted in the longitudinal direction, but it is possible to apply great force from the protrusion 20 to a body to be driven (not shown).

As shown in FIGS. 1A and 1B and FIGS. 9A to 9C, as the second electrode 150 of the piezoelectric vibrating body 100, at least one electrode layer can be provided. However, as shown in FIGS. 1A and 1B and FIGS. 9A and 9B, it is preferable to provide the second electrode 150 in a position diagonal to the rectangular piezoelectric vibrating body 100, because it is possible to deform the piezoelectric vibrating body 100 and the vibrating plate 200 in a meander shape to be curved in the plane thereof.

Embodiment of Apparatus Using Piezoelectric Driving Device

The piezoelectric driving device 10 described above can apply great force to a body to be driven by using resonance, and can be applied to various apparatuses. The piezoelectric driving device 10 can be used as a driving device in various apparatuses such as a robot (including an electronic component conveying apparatus (IC handler)), a pump for medication, a calendar transporting apparatus of a clock, and a printing apparatus (for example, a paper feeding mechanism, however, a vibrating plate is not resonated in a piezoelectric driving device used in a head, and accordingly, the piezoelectric driving device is not applied to a head), for example. Hereinafter, a representative embodiment will be described.

Figure 10:
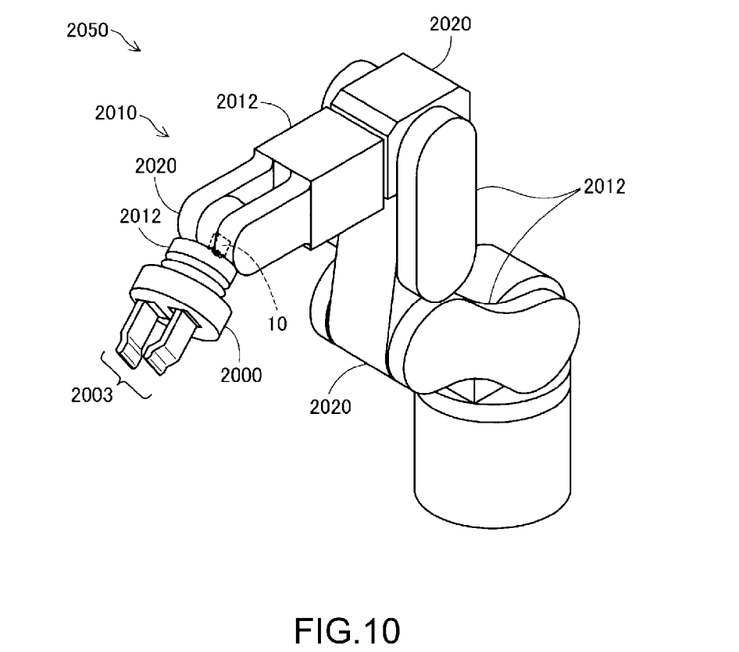
FIG. 10 is an explanatory diagram showing an example of a robot using the piezoelectric driving device.

FIG. 10 is an explanatory diagram showing an example of a robot 2050 using the piezoelectric driving device 10 described above. The robot 2050 includes an arm 2010 (also referred to as an "arm portion") which includes a plurality of linking portions 2012 (also referred to as "linking members") and a plurality of joints 2020 which are connected between the linking portions 2012 to be rotated or curved. The piezoelectric driving device 10 described above is embedded in each joint 2020, and it is possible to rotate or curve the joint 2020 by an arbitrary angle using the piezoelectric driving device 10. A robot hand 2000 is connected to an end of the arm 2010. The robot hand 2000 includes a pair of grasping portions 2003. The piezoelectric driving device 10 is also embedded in the robot hand 2000, and it is possible to open and close the grasping portions 2003 using the piezoelectric driving device 10 to grasp an object. In addition, the piezoelectric driving device 10 is also provided between the robot hand 2000 and the arm 2010, and it is possible to rotate the robot hand 2000 with respect to the arm 2010 using the piezoelectric driving device 10.

Figure 11:
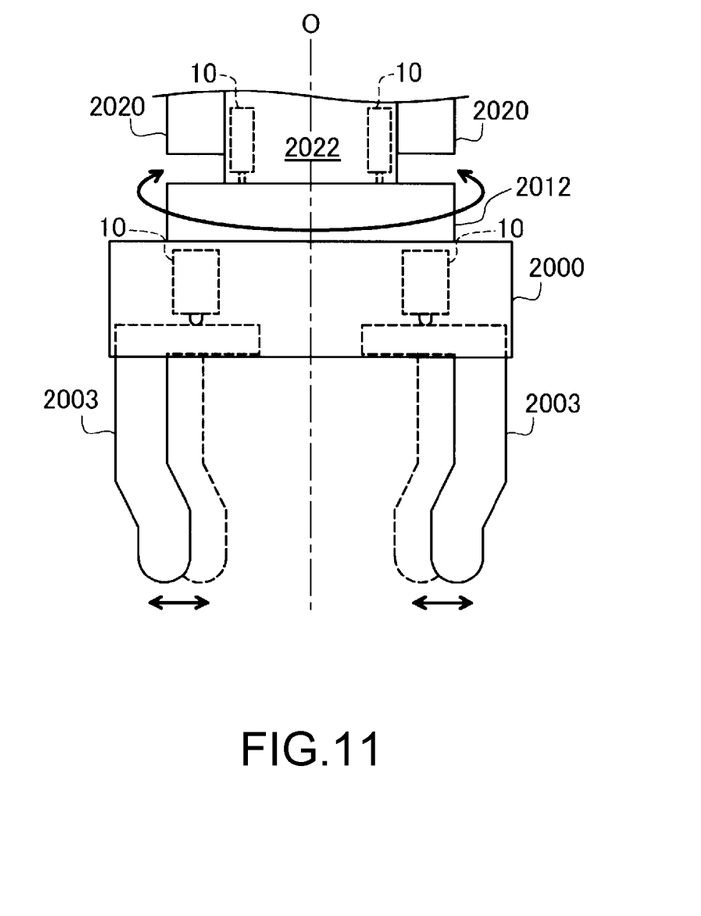
FIG. 11 is an explanatory diagram of a wrist part of a robot.

FIG. 11 is an explanatory diagram of a wrist part of the robot 2050 shown in FIG. 10. The wrist joints 2020 interpose a wrist rotation portion 2022 and a wrist linking portion 2012 is attached to the wrist rotation portion 2022 to be rotated around a center axis O of the wrist rotation portion 2022. The wrist rotation portion 2022 includes the piezoelectric driving device 10, and the piezoelectric driving device 10 rotates the wrist linking portion 2012 and the robot hand 2000 around the center axis O. The plurality of grasping portions 2003 are provided to stand on the robot hand 2000. A proximal end portion of the grasping portion 2003 can move in the robot hand 2000 and the piezoelectric driving device 10 is mounted in a base portion of this grasping portion 2003. Accordingly, by operating the piezoelectric driving device 10, it is possible to grasp a target by moving the grasping portion 2003.

The robot is not limited to a single arm robot, and the piezoelectric driving device 10 can also be applied to a multi-arm robot having two or more arms. Herein, in addition to the piezoelectric driving device 10, an electric power line for applying power to various devices such as a force sensor or a gyro sensor or a signal line for transmitting signals to the devices is included in the wrist joints 2020 or the robot hand 2000, and an extremely large number of wirings are necessary. Accordingly, it was extremely difficult to dispose wirings in the joints 2020 or the robot hand 2000. However, since the piezoelectric driving device 10 of the embodiment described above can decrease a driving current, compared to a general electric motor or a piezoelectric driving device of the related art, it is possible to dispose wirings even in a small space such as the joint 2020 (particularly, a joint on the edge of the arm 2010) or the robot hand 2000.

Figure 12:
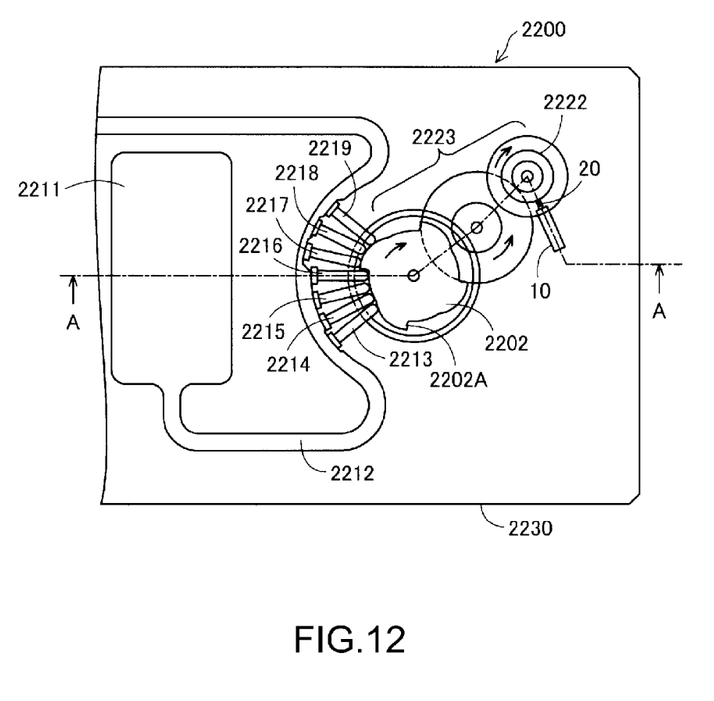
FIG. 12 is an explanatory diagram showing an example of a liquid feeding pump using the piezoelectric driving device.

FIG. 12 is an explanatory diagram showing an example of a liquid feeding pump 2200 using the piezoelectric driving device 10 described above. The liquid feeding pump 2200 includes a reservoir 2211, a tube 2212, the piezoelectric driving device 10, a rotor 2222, a deceleration transmission mechanism 2223, a cam 2202, and a plurality of fingers 2213, 2214, 2215, 2216, 2217, 2218, and 2219. The reservoir 2211 is an accommodation portion which accommodates liquid which is a transportation target. The tube 2212 is a tube which transports the liquid sent from the reservoir 2211. A protrusion 20 of the piezoelectric driving device 10 is provided in a state of being pressed against a side surface of the rotor 2222 and the piezoelectric driving device 10 rotates the rotor 2222. A rotation force of the rotor 2222 is transmitted to the cam 2202 through the deceleration transmission mechanism 2223. The fingers 2213 to 2219 are members which block the tube 2212. When the cam 2202 is rotated, the fingers 2213 to 2219 are pressed to the outer side in an emission direction in order, by a protrusion 2202A of the cam 2202. The fingers 2213 to 2219 block the tube 2212 in order from the upstream side in a transportation direction (reservoir 2211 side). Accordingly, the liquid in the tube 2212 is transmitted to the downstream side in order. By doing so, it is possible to accurately feed an extremely small amount of liquid and to implement a small liquid feeding pump 2200. The disposition of each member is not limited to that shown in the drawing. The members such as fingers may not be provided and a ball or the like provided on the rotor 2222 may block the tube 2212. The liquid feeding pump 2200 described above can be used as a dosing apparatus which gives medication such as insulin to a human body. Herein, by using the piezoelectric driving device 10 of the embodiment described above, a driving current is decreased, compared to a case of the piezoelectric driving device of the related art, and accordingly, it is possible to decrease power consumption of the dosing apparatus. Accordingly, when the dosing apparatus is driven with a battery, the effects are particularly effective.

MODIFICATION EXAMPLES

The invention is not limited to the examples or embodiments described above and can be implemented in various forms within a range not departing from a gist thereof, and the following modifications can also be performed, for example.

Modification Example 1

In the embodiment, the first electrode 130, the piezoelectric body 140, and the second electrode 150 are formed on the substrate 120, but the substrate 120 may be omitted and the first electrode 130, the piezoelectric body 140, and the second electrode 150 may be formed on the vibrating plate 200.

Modification Example 2

In the embodiment, one piezoelectric vibrating body 100 is provided on both surfaces of the vibrating plate 200, but one of the piezoelectric vibrating bodies 100 can be omitted. However, it is preferable to provide the piezoelectric vibrating body 100 on both surfaces of the vibrating plate 200, because the vibrating plate 200 can be deformed in a meander shape to be curved in the plane thereof.

Hereinabove, the embodiments of the invention have been described based on some examples, but the embodiments of the invention are for easy understanding of the invention and not for limiting the invention. The invention can include modifications, improvement, and equivalents to the invention, without departing from a gist and a scope of the aspects.

The entire disclosure of Japanese Patent Application No. 2014-164628, filed Aug. 13, 2014 is expressly incorporated by reference herein.

What is claimed is:

1. A piezoelectric driving device comprising:
   a piezoelectric body;
   an electrode provided on the piezoelectric body;
   a driving circuit which applies a driving voltage to the electrode;
   a vibrating plate which includes a first surface and a second surface; and
   a piezoelectric vibrating body which includes the piezoelectric body and the electrode,
   wherein the piezoelectric body has a thickness of 0.05 µm to 20 µm,
   the driving voltage is a voltage obtained by adding an offset voltage to a fluctuating voltage, and
   the piezoelectric vibrating body is disposed on at least one surface of the first surface and the second surface of the vibrating plate.

2. The piezoelectric driving device according to claim 1, wherein the material of the piezoelectric body includes lead zirconate titanate, and
   the offset voltage is equal to or greater than 20 V.

3. The piezoelectric driving device according to claim 1, wherein the piezoelectric body has a thickness of 0.05 µm to 10 µm.

4. The piezoelectric driving device according to claim 1, wherein the piezoelectric body has a thickness of 0.05 µm to 3 µm.

5. The piezoelectric driving device according to claim 1, wherein the piezoelectric vibrating body is disposed on the first surface and the second surface of the vibrating plate.

6. The piezoelectric driving device according to claim 1, further comprising:
   a protrusion which is provided on the vibrating plate and comes into contact with a body to be driven.

7. The piezoelectric driving device according to claim 1, wherein the electrode includes a first electrode and a second electrode, and
   the piezoelectric body is positioned between the first electrode and the second electrode.

8. A robot comprising:
   a plurality of linking portions;
   joints connected to the plurality of linking portions; and
   the piezoelectric driving device according to claim 1 which rotates the plurality of linking portions using the joints.

9. A robot comprising:
   a plurality of linking portions;
   joints connected to the plurality of linking portions; and
   the piezoelectric driving device according to claim 2 which rotates the plurality of linking portions using the joints.

10. A robot comprising:
    a plurality of linking portions;
    joints connected to the plurality of linking portions; and
    the piezoelectric driving device according to claim 3 which rotates the plurality of linking portions using the joints.

11. A robot comprising:
    a plurality of linking portions;
    joints connected to the plurality of linking portions; and
    the piezoelectric driving device according to claim 4 which rotates the plurality of linking portions using the joints.

12. A driving method of the robot according to claim 8, wherein a driving circuit of the piezoelectric driving device applies a voltage obtained by applying an offset voltage to an AC voltage as a driving voltage, to the electrode, to rotate the plurality of linking portions using the joints.

13. A driving method of the robot according to claim 9, wherein a driving circuit of the piezoelectric driving device applies a voltage obtained by applying an offset voltage to an AC voltage as a driving voltage, to the electrode, to rotate the plurality of linking portions using the joints.

14. A driving method of the robot according to claim 10, wherein a driving circuit of the piezoelectric driving device applies a voltage obtained by applying an offset voltage to an AC voltage as a driving voltage, to the electrode, to rotate the plurality of linking portions using the joints.

15. A driving method of the robot according to claim 11, wherein a driving circuit of the piezoelectric driving device applies a voltage obtained by applying an offset voltage to an AC voltage as a driving voltage, to the electrode, to rotate the plurality of linking portions using the joints.

16. A driving method of the piezoelectric driving device according to claim 1, comprising:
applying a voltage obtained by applying an offset voltage to an AC voltage as a driving voltage to an electrode.

17. A driving method of the piezoelectric driving device according to claim 2, comprising:
applying a voltage obtained by applying an offset voltage to an AC voltage as a driving voltage to an electrode.

18. A driving method of the piezoelectric driving device according to claim 3, comprising:
applying a voltage obtained by applying an offset voltage to an AC voltage as a driving voltage to an electrode.

19. A driving method of the piezoelectric driving device according to claim 4, comprising:
applying a voltage obtained by applying an offset voltage to an AC voltage as a driving voltage to an electrode.

* * * * *